United States Patent [19]
Baker et al.

[11] Patent Number: 5,444,859
[45] Date of Patent: Aug. 22, 1995

[54] METHOD AND APPARATUS FOR TRACING MULTIPLE ERRORS IN A COMPUTER SYSTEM SUBSEQUENT TO THE FIRST OCCURENCE AND PRIOR TO THE STOPPING OF THE CLOCK IN RESPONSE THERETO

[75] Inventors: Jeffrey L. Baker, Milpitas; Robert G. Stebbins; Quang H. Nguyen, both of San Jose, all of Calif.

[73] Assignee: Amdahl Corporation, Sunnyvale, Calif.

[21] Appl. No.: 953,543

[22] Filed: Sep. 29, 1992

[51] Int. Cl.⁶ .................................. G06F 11/00
[52] U.S. Cl. .................... 395/575; 371/5.1; 371/48; 395/550; 395/200.01; 395/183.06; 395/183.1
[58] Field of Search .............. 395/575; 371/48, 5.1, 371/5.5; 364/932.62, 964.341, 265, 265.6, 237.82, 280.8

[56] References Cited
U.S. PATENT DOCUMENTS

| | | | |
|---|---|---|---|
| 3,898,621 | 8/1975 | Zelinski et al. | 340/172.5 |
| 4,679,195 | 7/1987 | Dewey | 371/16 |
| 4,783,783 | 11/1988 | Nagai et al. | 371/12 |
| 4,924,466 | 5/1990 | Gregor et al. | 371/12 |
| 5,220,567 | 12/1991 | Dooley et al. | 371/5.1 |
| 5,251,227 | 10/1993 | Bruckert et al. | 371/12 |

*Primary Examiner*—Robert W. Beausoliel, Jr.
*Assistant Examiner*—Norman M. Wright
*Attorney, Agent, or Firm*—Fliesler, Dubb, Meyer & Lovejoy

[57] ABSTRACT

An approach to error assessment in computer systems is based on storing important state information while the machine is operating in a trace memory for each cycle of the clock. The trace memory is then coupled through the scan interface or otherwise to the service processor for use in analyzing the error. A set of signal lines in the data processing system is connected in parallel to the input port of the trace memory. Storing logic is coupled to the processor clock and to the input port of the memory, for storing information from the set of signal lines in successive locations in the trace memory in response to successive cycles of the clock. The output port of the trace memory is coupled to the service processor. The system also includes logic which counts the number of cycles of the clock after detection of an error until stopping of the clock and a system for tagging storage locations in the trace memory that correspond to cycles in which an error was detected.

15 Claims, 6 Drawing Sheets

METHOD AND APPARATUS FOR TRACING MULTIPLE ERRORS IN A COMPUTER SYSTEM SUBSEQUENT TO THE FIRST OCCURENCE AND PRIOR TO THE STOPPING OF THE CLOCK IN RESPONSE THERETO

BACKGROUND OF THE INVENTION

1. Field of the Invention

The present invention relates to mechanisms for assessing damage caused by an error in computer systems; and more particularly to systems for tracing the impact of an error on a data processing unit within a large scale computer system.

2. Description of Related Art

In large scale computer systems, such as those operating in accordance with the IBM ESA/390 architecture, the impact of an error is frequently determined by the state of the machine when the error occurred. Prior art machines use hardware to assess the severity of a particular error. Thus, error detection logic is distributed in prior art machines which detects and signals a service processor through a scan facility or otherwise of the occurrence of the error, and of the classification for the error based on the state of the machine when the error occurred. The service processor coupled to the scan facility, is then capable of taking an appropriate response.

Use of hardware to assess the damage caused by an error suffers many disadvantages. In particular, the hardware must be designed in advance based on a prediction of the types of errors that may occur. Thus, the hardware may not include information that could be critical to assessing the damage caused by an error that may be considered unlikely when the machine is designed. Also, the hardware costs of logic incorporating all important machine state information are quite high in complex machines.

Accordingly, it is desirable to provide a mechanism for assessing damage caused by an error, that provides more flexibility and less hardware costs.

SUMMARY OF THE INVENTION

The present invention provides an approach to error assessment which is more flexible than the prior art hardware signaling technique, and results in a reduced hardware cost. Basically, the invention is based on storing important state information while the machine is operating in a trace memory for each cycle of the clock. The trace memory is then coupled through the scan interface or otherwise to the service processor for use in analyzing the error.

Thus, the invention can be characterized as an apparatus for tracing errors in a data processing system which includes a memory having an input port and an output port. A plurality of signal lines in the data processing system are connected in parallel to the input port of the memory. Storing logic is coupled to the processor clock and to the input port of the memory, for storing information from the plurality of signal lines in successive locations in the memory in response to successive cycles of the clock. The output port is coupled to a service processor, through a scan interface or otherwise, for reading the information in the memory for use in error analysis after detection of the error. The information stored in the memory can be quite extensive. Thus, the ability to trace errors within the data processing system is greatly enhanced. Software can read the trace history in the memory, and perform sophisticated analysis routines.

The system also includes logic for identifying a storage location corresponding to a cycle in which the error was detected. This logic includes a counter, which counts the number of cycles of the clock after detection of an error until stopping of the clock. The logic may also include a system for tagging storage locations in the memory that correspond to cycles in which an error was detected. The tagging may be accomplished by applying a signal indicating that an error has occurred within the system as an input to the memory which is stored on each cycle of the clock.

According to another aspect of the invention, the error detection logic stores a multiple error signal, if a second error is detected between a first error and stopping of the clock in response to the first error. Thus, a current address for the trace memory, the count of the number of cycles from the detection of the first error until stopping of the clock, and the multiple error signal are utilized for the purpose of locating cycles in which errors occurred.

According to another aspect of the invention, the trace memory is applied to a unit of a data processing system which includes a plurality of integrated circuits connected by primary circuit paths. The input port of the memory is coupled to the circuit paths that interconnect the integrated circuits, such as at the I/O pins or conductors on a circuit board for the chips.

In a preferred implementation of the present invention, the trace facility is applied to a mainframe computer system which includes a plurality of processing units and a clock controller that supplies clocks for the plurality of processing units. Each storage location in the trace memory is connected to a set of the signals in a particular processing unit, such as a storage unit, for identifying status of the particular processing unit during each clock cycle. Error detection logic within the processing unit signals the clock controller to stop the clock for the processing unit which suffers the error within a number of cycles after detection of the error. A scan interface to the processing unit provides access to storage locations in the processing unit and the trace memory while the clock is off for the processing unit, for a service processor performing error analysis.

In a preferred system, the processing unit to which the trace facility is applied is the storage unit including a store-to cache. The information stored in each memory location includes information concerning state of the store-to cache including logical addresses, op codes, error signals, processor domain state information, retry bits, operand addresses, translator program counter addresses, mode control bits, timers, operand length codes, protection keys, parity bits, and other information. Thus, in one application, there are over 185 bits per cycle stored to characterize the state of the storage unit pipeline.

Using the trace facility, software executed by the service processor is provided with a great deal of information useful in assessing the propagation of errors through the system in the interim between detection of the error and the stopping of clocks. The software can be optimized as experience with the system employing the trace facility is gained, without requiring hardware fixes to the error monitoring logic in the system.

Other aspects and advantages of the present invention can be seen upon review of the figures, the detailed description, and the claims which follow.

DESCRIPTION OF THE PREFERRED EMBODIMENTS

Figure 1:
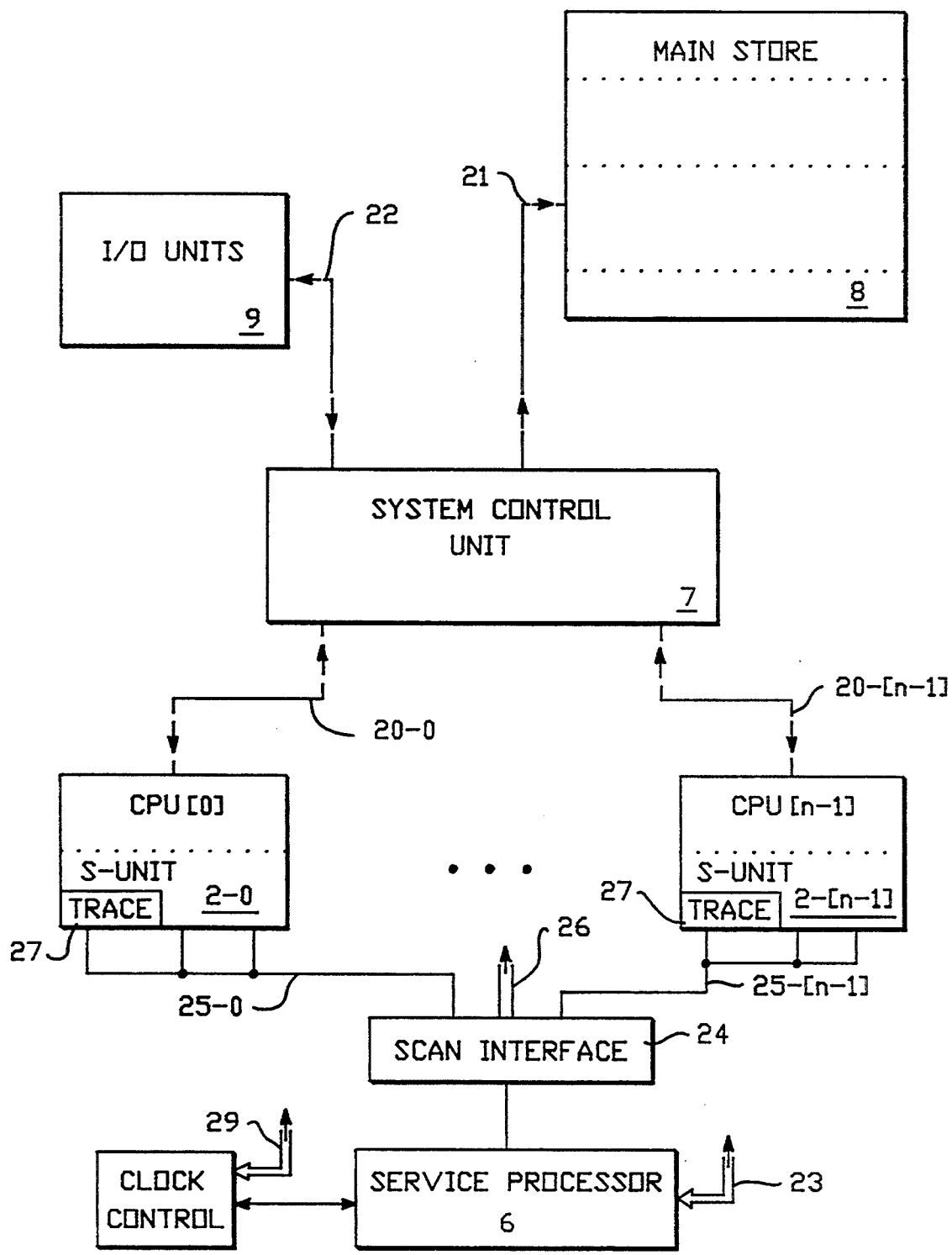
FIG. 1 depicts a block diagram of a multiple CPU system incorporating a trace facility according to the present invention.
Figure 2:
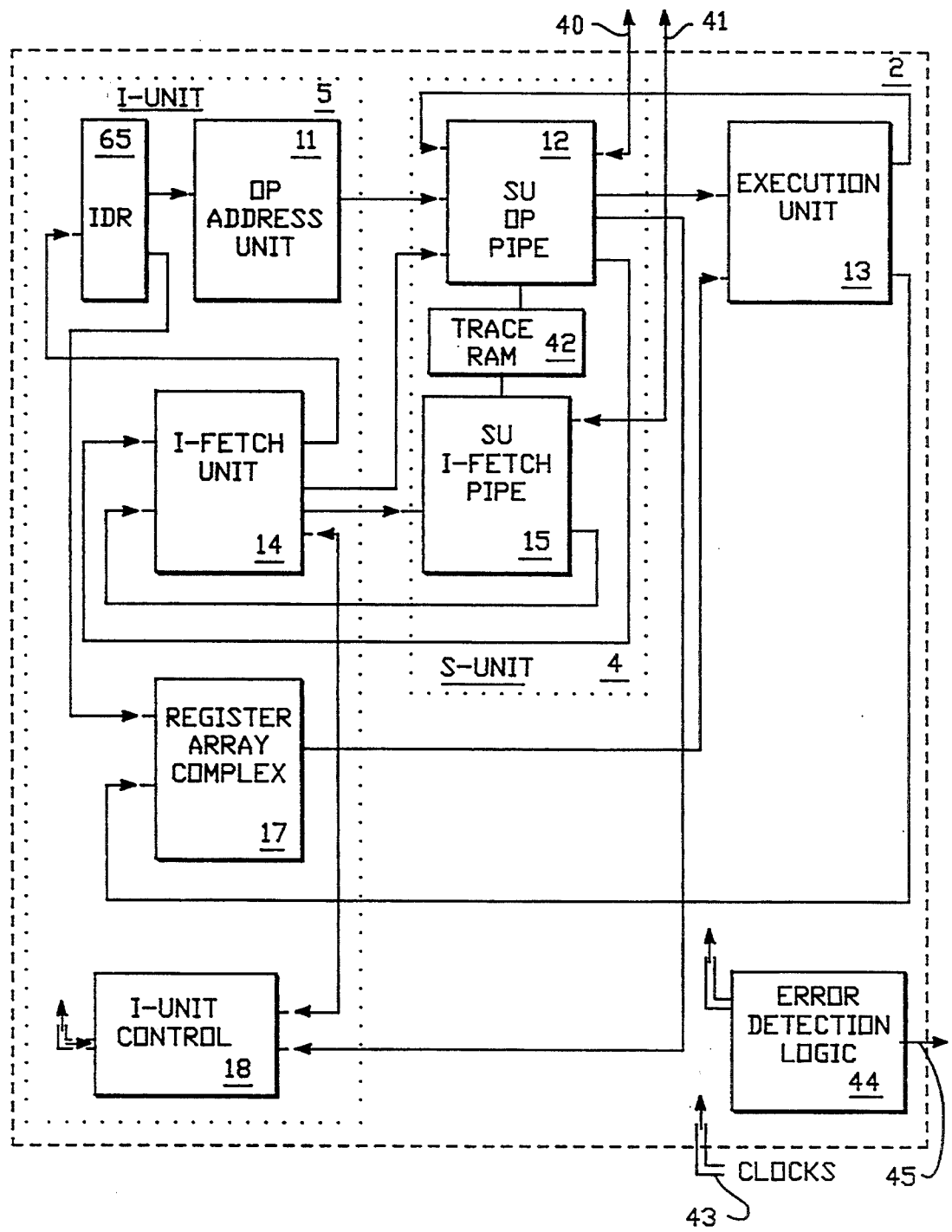
FIG. 2 depicts a block diagram of a CPU incorporating the trace facility in the storage unit according to the present invention.
Figure 3:
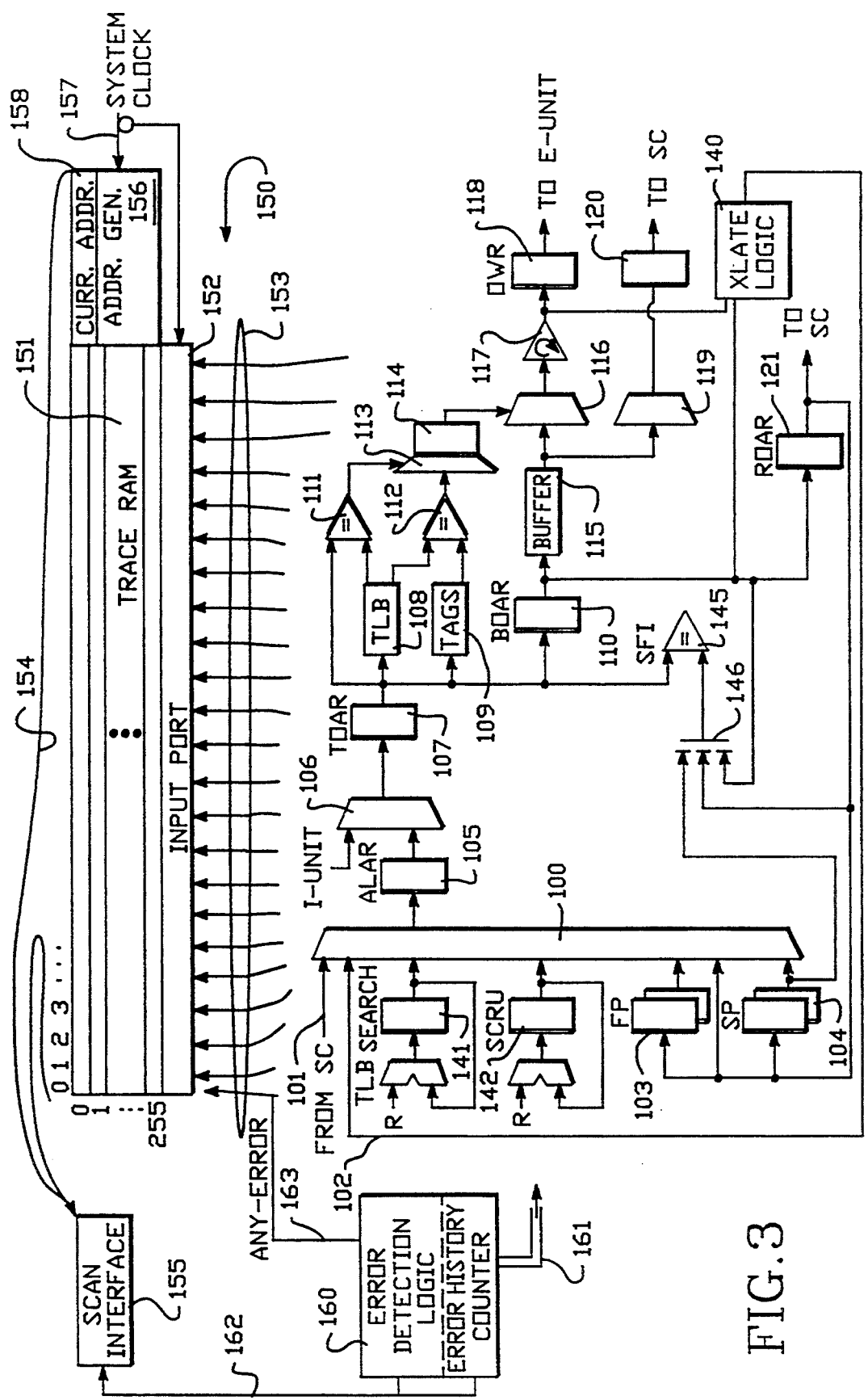
FIG. 3 is a schematic block diagram of the storage unit pipeline with a trace RAM according to the present invention.
Figure 4:
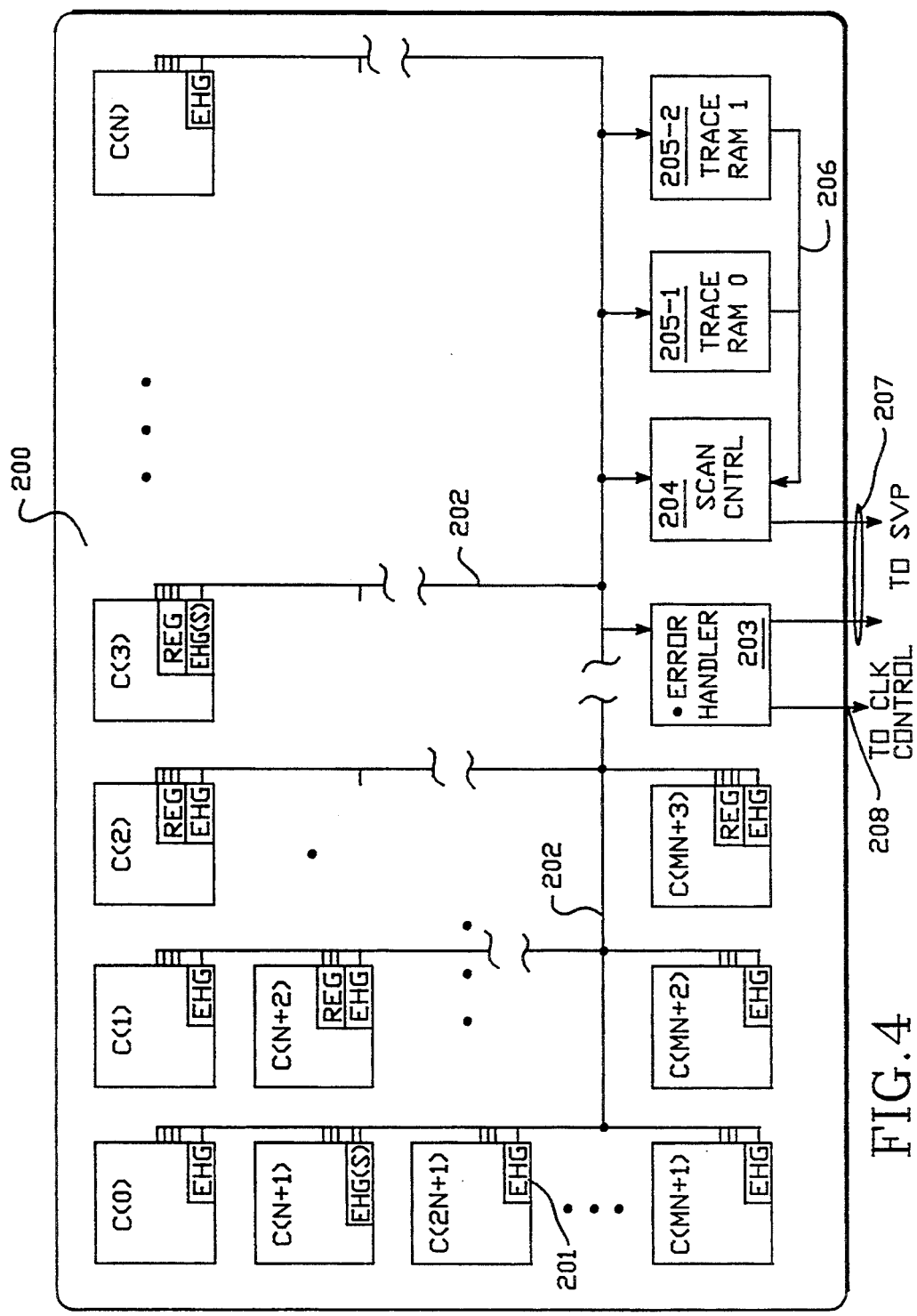
FIG. 4 shows a plurality of integrated circuits implementing a storage unit with the trace facility according to the present invention.
Figure 5:
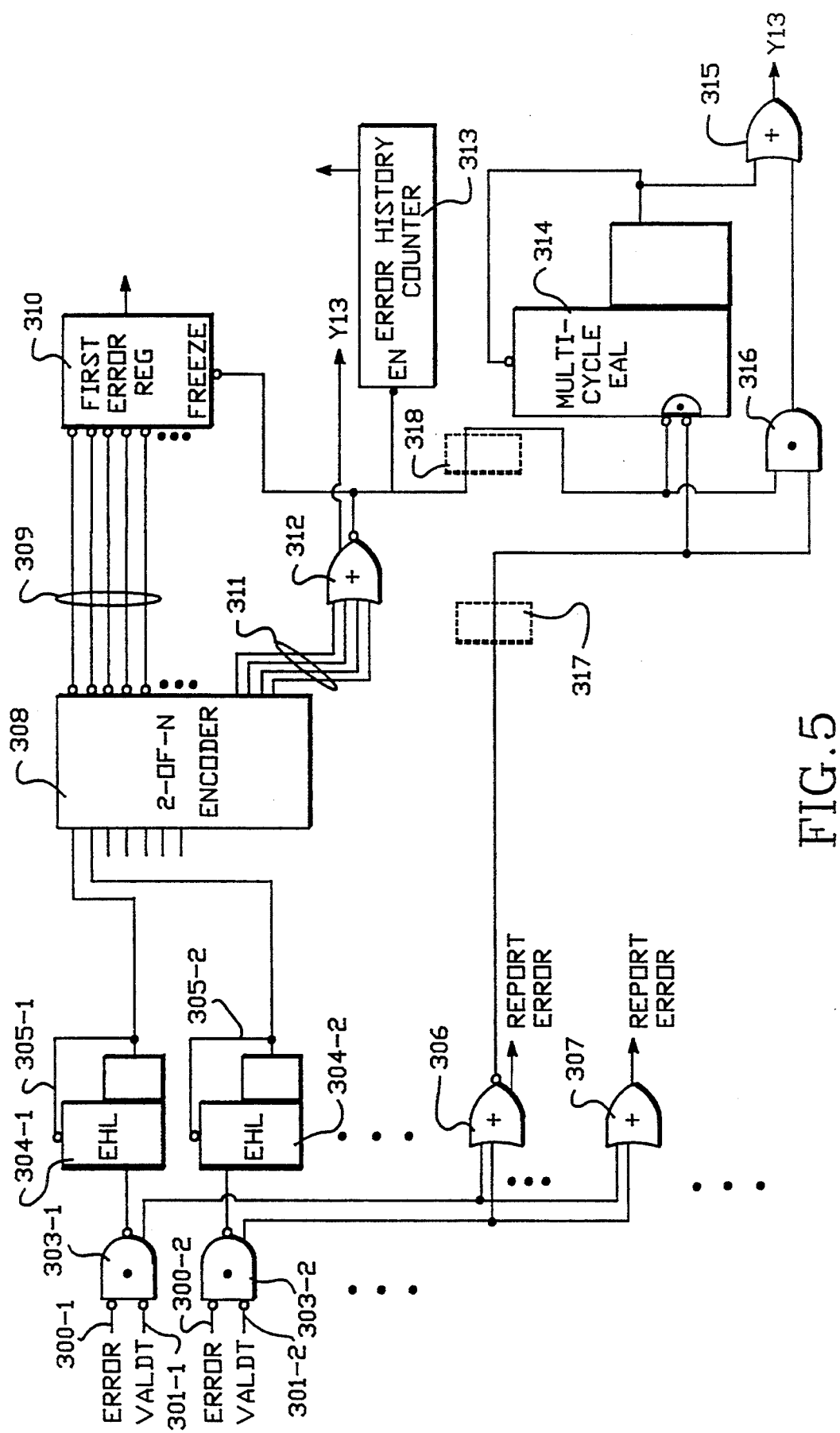
FIG. 5 is a schematic diagram of the error detection logic and error history counter for each error history group according to the present invention.
Figure 6:
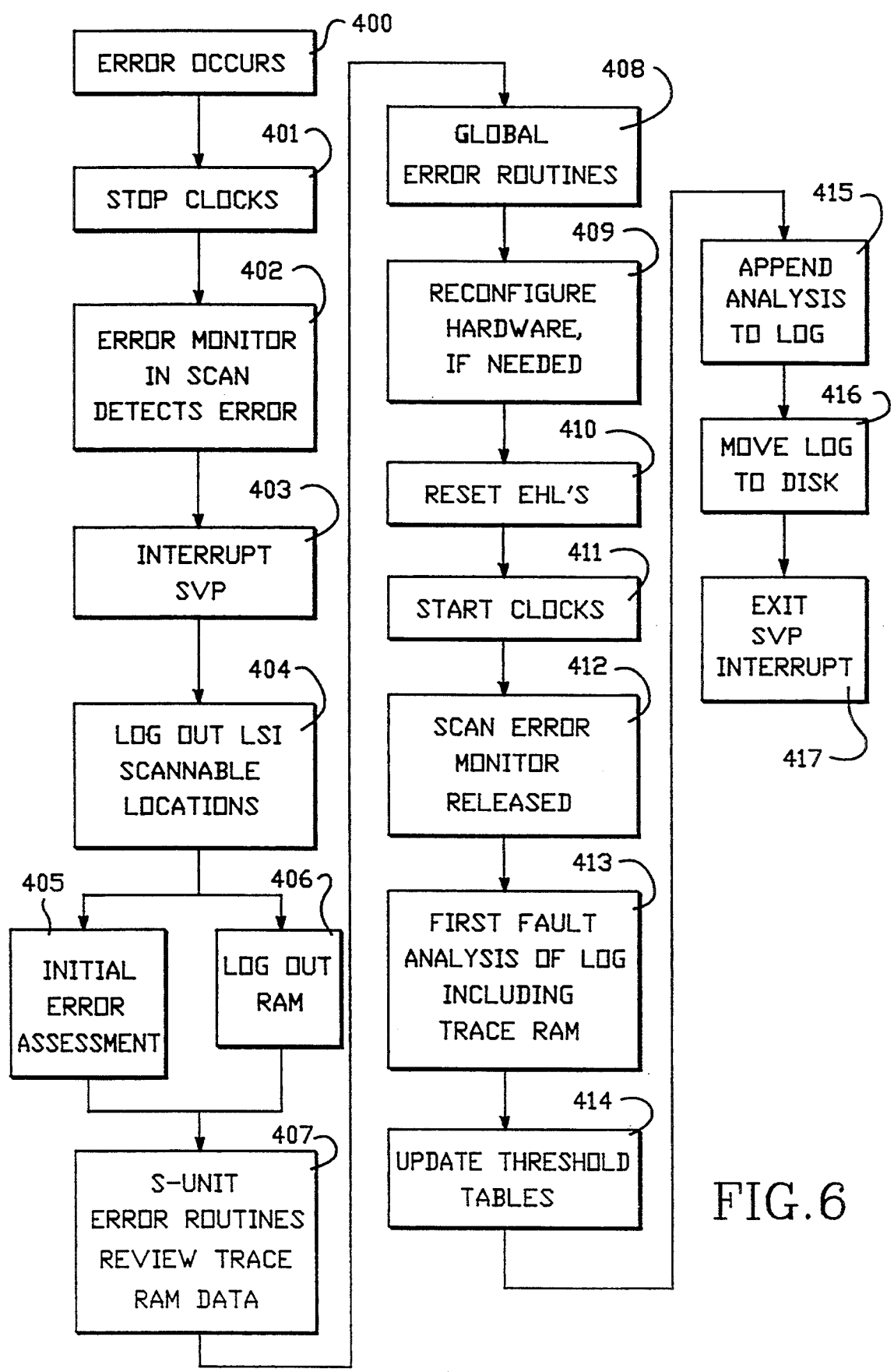
FIG. 6 is a flow chart of a service processor routine for analysis of an error using the trace facility according to the present invention.

A detailed description of the preferred embodiments is presented with respect to the figures. FIGS. 1 and 2 provide a system overview of a computer system implementing the-present invention. FIGS. 3–5 provide a detailed functional description of a storage unit with a trace facility according to the present invention. FIG. 6 illustrates a method for using the information in the trace facility in error analysis.

Computer System Overview—FIGS. 1 and 2

FIG. 1 illustrates a multi-CPU computer system according to the present invention. The computer system includes a plurality of central processing units, each having a storage unit with a trace facility according to the present invention. Thus, CPUs (0) through CPU (n−1) are given reference numbers 2-0 through 2-(n−1). Each of the CPUs is coupled to system control unit 7 across interfaces 20-0 through 20-(n−1). The system control unit 7 also includes a mainstore interface 21. The system control unit 7 controls access to data among the CPUs and mainstore 8. Also coupled to the system control unit 7 through interface 22 are input/output units 9. A clock controller 28 supplies clocks to the processing units in the system and receives clock stop signals generated by error detection logic in the processing units across lines 29. It can take from 10 to 20 cycles to stop the clock in a large scale system.

A service processor 6 is coupled to all of the functional units of the computer system, as indicated by arrows 23. A scan interface 24 for the service processor provides access to storage locations in the CPUs, (and other system units) through paths 25-0, 25-(n−1), (and paths 26) independent of the normal operational path of the CPUs.

As indicated in the figure, each of the CPUs, CPU-0 through CPU-n−1 includes an individual storage unit. Each storage unit includes an operand cache and an instruction cache. The operand cache and instruction cache are coupled to a trace facility 27 according to the present invention as described in more detail below.

The service processor 6 is able to scan data indicating the state of the computer system out of the computer system when the clocks for the processing units are off. The data which can be scanned out includes trace data from the trace facility. Also, the service processor is able to write data into certain data locations when the clocks are off within the functional units of the system.

FIG. 2 provides a more detailed diagram of a CPU 2 according to the present invention. The CPU 2, as illustrated in FIG. 1, is coupled to the system control unit 7 across lines 40, 41. The service processor 6 is coupled to the CPU 2 with scan-in and scan-out facilities (not shown).

The CPU 2 includes an instruction unit 5 (I UNIT), a storage unit 4 (S UNIT), and an execution unit 13 (E UNIT). The I UNIT 5 includes an instruction decode register 65 (IDR) which supplies input to an operand address unit 11. Also, the IDR 65 supplies input to register array complex 17. The input to the IDR 65 is provided by an instruction fetch unit 14 (I FETCH UNIT). I UNIT control 18 controls the operation of the functional blocks of the I UNIT 5 and includes explicit connections to the I FETCH UNIT 14 and the S UNIT operand pipe 12.

The S UNIT 4 includes a storage unit operand pipe 12, a storage unit I FETCH pipe 15, and a trace RAM 42 (see FIG. 3). Coupled to the operand pipe 12 is an associatively addressed operand cache operated in a "store-to" configuration so that modified lines are updated in the cache before updating the mainstore. Similarly, coupled to the I FETCH pipe 15 is an associatively addressed instruction cache. The S UNIT operand pipe 12 is addressed from the output of the operand address unit 11 and the I FETCH UNIT 14. The S UNIT I FETCH pipe 15 receives its addresses from the I FETCH UNIT 14. The S UNIT operand pipe 12 supplies data to the E UNIT 13, the I UNIT control 18, and the I FETCH UNIT 14. The S UNIT I FETCH pipe 15 provides data to the I FETCH UNIT 14. Both the S UNIT I FETCH pipe 15 and the S UNIT operand pipe 12 are coupled to the system control unit 7, through which access to the mainstore 8 is provided and data integrity operations are accomplished to insure cache consistency with other CPUs in the system.

The E UNIT 13 provides resulting data to the S UNIT operand pipe 12 and to the register array complex 17. The CPU 2 receives clocks across line 43 from the clock controller, and reports errors using error detection logic 44, to the service processor across line 45.

The overall computer system as described in FIGS. 1 and 2 operates in accordance with the IBM ESA/390 architecture and is further compatible with the Amdahl 5995-A computer.

S UNIT With Trace Facility. (FIGS. 3, 4, and 5)

FIGS. 3–5 illustrate the storage unit having a trace facility according to the present invention. FIG. 3 is a simplified functional diagram of the S UNIT operand pipe. The system includes priority logic 100 receiving a plurality of requests for access to the cache. The inputs to the priority logic 100 include requests from the system controller (SC) 101, and requests 102 for processes from address translation logic 140. Also, requests from fetch ports 103, store ports 104, TLB search logic 141, and background cache error scrubbing logic 142 are connected to priority logic 100. The output of the priority logic 100 is supplied to an address register 105. The address register 105 supplies its output to a second level of priority logic 106. The instruction unit has an access to the storage unit pipe through priority logic 106. The output of the priority logic 106 is supplied to the T cycle operand address register 107. The T cycle operand address register 107 is used to access the translation lookaside buffer 108 (TLB) and tag memory 109 and is connected to store-fetch interlock (SFI) comparator 145. Also, the output of the T cycle operand address register 107 is supplied to the B cycle operand address register 110.

The output of the TLB 108 is supplied to TLB match logic 111 in parallel with the output of the T cycle operand address register 107. Similarly, the output of the tag memory 109 is supplied to tag match logic 112 in parallel with a segment of the TLB memory 108. The output of the tag match logic is supplied to associativity selector 113 which is further enabled by the TLB match logic 111. The results of the tag match are stored in register 114.

In parallel, the B cycle operand address register 110 is used to access the buffer memory 115. The outputs of the buffer memory 115 are supplied to associativity selector 116 which is enabled by the results of the tag match from register 114. The output of the selector 116 is supplied through alignment logic 117 to operand word register 118, and then to the execution unit. Also, the output of alignment logic 117 is supplied to the translation logic 140, which supports address translations used for logical and real addressing.

Similarly, the output of the buffer 115 is supplied to associativity select logic 119 and on to a data move out register 120 which is coupled to the system controller.

The output of the B cycle operand address register 30 supplied to the translation logic 140, and to an R cycle operand address register 121 which is connected to the system controller, and to the store ports 104 and fetch ports 103. The outputs of the B cycle operand address register 110, R cycle operand address register 121, and store ports 104 are coupled in a logical OR function 146 to the SFI comparator 145.

In the system described in FIG. 3, the TLB 108, tags 109, and buffer 115 are divided into a plurality of segments or associativities. Thus, the TLB match logic 111 and tag match logic 112 includes a match logic segment for each associativity of the TLB and the tag.

Not shown in FIG. 3 are control paths for op codes, status valid signals, domain state signals, parity checking logic, and other information involved in the pipeline.

A trace facility, generally 150, is coupled to the storage unit pipeline. The trace facility includes trace RAM 151 which includes 256 storage locations 0 through 255. The trace RAM includes an input port, generally 152, which is coupled across lines 153 to storage locations within the storage unit. The trace RAM 151 also includes an output port, generally designated by lines 154, which are coupled to the scan interface 155 of the storage unit. An address generator 156 is coupled to the trace RAM 151 for generating trace RAM addresses. The system clock is supplied on line 157 to the address generator 156 as well as the input port 152. The address generator 156 includes address increment logic which controls the trace RAM like a circular buffer. Thus, when all 256 locations in the trace RAM have been used, the 256 cycle old data is overwritten by new data. Also, the address increment logic stores a current address pointer 158 which is also coupled to the output port 154 of the trace RAM.

The information supplied from the cache pipeline across lines 153 includes data from storage locations within the pipeline that store important state information specifying machine operation. This information includes buffer addresses, associativity select signals, op codes, operand length codes, pipe valid signals, priority control signals, translation logic state information including program counter addresses from the translation logic, store port data, fetch port data, retry signals, processor domain signals, timer signals, control signals involved in the system controller interface, such as move in and move out signals, signals involved in the instruction unit interface including miss ahead pre-fetch signals, and other information. In the preferred system, there are 185 bits stored in each storage location on each cycle of the clock. A designer may store as much information as practical in the trace RAM, so that software can be adapted to sophisticated error analysis routines. Alternatively, the information may be limited to selected critical signals.

Also included in the storage unit is error detection logic 160 which is distributed across lines 161 to important storage locations and communication lines in the system. Coupled with the error detection logic 160 is at least one error history counter, which counts the number of cycles between detection of an error and the stopping of clocks in response to the error. The error detection logic, including the error history counter, are coupled across line 162 to the scan interface 155 for communication with the service processor.

Also, the error detection logic 160 includes circuitry for generating an any-error signal on line 163 which is bundled with lines 153 as status information supplied to the input port 152 of the trace RAM 151. Any-error signal 163 serves to tag lines in the trace RAM corresponding to cycles in which any error was detected within the storage unit. This tag can be used by the service processor in error analysis.

The status information in lines 153 may include data from a plurality of cycles of the cache pipeline. Thus, it may be desirable to group the signal lines 153 at the input port 152 so that the order in which the data is stored within the trace RAM is more easily parsed by the software.

The trace facility, according to the present invention, is only applied in the storage unit of the computer system, because the storage unit is a focus of data integrity in a system relying on a store-to cache. Of course, the trace facility may be more widely applied in the system, or used in other units or sub-units, as suits the need of a particular design.

FIG. 4 illustrates the implementation of the interconnect lines 153 with the trace RAM facility in a preferred embodiment of the present invention. As can be seen in FIG. 4, a plurality of integrated circuit chips C(n) is mounted on a printed circuit board 200. The integrated circuits C(n) comprise the storage unit in the mainframe processor which implements the trace facility. These integrated circuits are interconnected using primary circuit paths connected by I/O pins on the chips and conductors on the circuit board or between circuit boards. The primary circuit paths are not shown in FIG. 4 for clarity, but are used during normal operation of the machine for processing data. Also, each of the chips includes at least one error history group EHG (e.g., EHG 201 on chip C(2N+1)). These error history groups include error detection logic and error history counters, such as illustrated in FIG. 5.

Many of the interconnect pins on the integrated circuit chips carry parity checked data values coupled to storage locations in the unit which indicate status information. A subset of these signal lines are tapped on bus system 202 along with the outputs of the error history groups in the array of chips. Also, the bus system 202 schematically represents the scan lines for the unit serving the scan interface. The bus system 202 delivers the error signals from the error history groups to error handler chip 203. Also, a scan control chip 204 is coupled to bus system 202. Finally, the trace RAM facility is distributed across chips 205-1 and 205-2 and coupled to the bus system 202. Two chips are used because of the large number of bits that are stored per line in a preferred system. The trace RAMs are coupled across line 206 to the scan control chip 204. The scan control chip and the error handling chip are coupled across lines 207 to the service processor. Also, the error handler chip 203 is coupled to clock control across line 208. In the preferred system, the stored unit implementing the trace facility includes over 60 integrated circuit chips which are coupled to the trace facility in the manner illustrated.

FIG. 5 illustrates the logic of each error history group. Error history groups receive error signals at inputs 300-1, 300-2, and so on. Coupled with the error signals 300-1, 300-2 are validate signals 301-1 and 301-2 which indicate whether the error signal which is coupled with it, is generated in response to stable data. The error signal and its validate signal are coupled as inputs to gates 303-1, 303-2, and so on, which are implemented in the logic shown in FIG. 5 with active low input NAND gates. The active low outputs of the NAND gates 303-1, 303-2 are coupled as inputs to error history latches 304-1, 304-2, and so on. The error history latches are implemented as master/slave latches and have an active low clock enable input which is driven by the output of the slave latch across lines 305-1, 305-2. Thus, when data is stored in the latch, the clock to the latch is disabled until the latch is cleared. In this manner, the error history latches will store a signal indicating that an error has been detected in the storage unit.

The active high outputs of the gates 303-1, 303-2 are supplied as inputs to gates 306 and 307. The active high outputs of gates 306 and 307 are used to report the error to the service processor. Each of these gates can be used to report a different classification of error as known in the art. Thus, one output may report errors that occur before posting status valid to the execution unit, another class of errors may be reported if the error occurs after posting status valid to the execution unit and a final classification of error may be posted if the error is detected too late to prevent posting status valid, but early enough to take other corrective action in the execution unit.

The outputs of the error history latches 304-1, 304-2, and so on, are supplied as inputs to a 2-of-N encoder 308. The encoder 308 generates a 2 bit signal on lines 309 which is stored in a first error register 310. Thus, for any error indicated by the encoder 308, two lines out of the set of lines 309 are activated to identify the error. An active high set of outputs of the 2-of-N encoder is supplied on lines 311. There is one less line in the set 311 than in the set 309 for the purposes of debugging, as known in the art. However, whenever the encoder 308 asserts a valid error pattern on lines 309, at least one of the signals in lines 311 will be asserted. These signals are supplied as inputs to gate 312 which supply a logical NOR signal to an active low freeze input on the first error register 310. In this way, the identification of the error first detected is stored in the first error register 310 for use by the service processor.

Also, the active low output of the gate 312 is supplied to an active low enable signal on an error history counter 313. The error history counter begins counting clock cycles until the clocks are stopped in response to the error.

In addition, the output of the gate 312 is supplied as an active low input to a multi-cycle error action latch 314. The error action latch 314 stores the logical AND of the output of gate 312 and the output of gate 306. Thus, the multi-cycle error action latch will store a signal which is the logical AND of the output of gate 312 indicating that an error has first occurred, and the output of gate 306 indicating that an error has occurred after the error indicated by gate 312 but before clocks are stopped. The error action latch 314 has a clock enable input which is driven by the output of the slave latch. Thus, after a signal has been stored in the latch 314, the clock enable input is disabled and the data is frozen for use by the service processor. This data is supplied as an input to OR gate 315. The second input to OR gate 315 is supplied from AND gate 316. The inputs to AND gate 316 include the output of gate 312 and gate 303. The path through AND gate 316 is used in the event latches 317 and 318 are necessary for timing requirements in a particular implementation. If the latches 317 and 318 are not necessary, then the gate 316 can be eliminated.

Thus, each error history group includes an error history counter 313, a first error register 310, multi-cycle error signal stored in latch 314, and means for reporting any error which has occurred.

Thus, the trace facility in the storage unit records in the 256 location RAM important state information during machine operation. When all 256 locations have been used, the 256 cycle old data is overwritten by new data. When an error occurs, the chip suffering the error starts an error history counter and requests that clock be turned off. The number of cycles between the time that the request to turn off clocks is made and the time that the clocks are turned off is called the clocks off latency. After the error occurred, but before clocks are turned off, the error history counter increments by 1 every cycle. When the clocks are turned off, the error history counter indicates how many cycles ago the error occurred. Software in the service processor uses the error history counter value to determine how far back in the trace RAM to look to determine what the machine state was when the error occurred. The software then uses this machine state information to assess the damage that the error caused.

There is only one error history counter per error history group. Therefore, if the error persists for more than one cycle, the error may have caused more severe damage than indicated by the trace RAM entry pointed to by the error history counter. Similarly, if different errors in the group occurred during different cycles, their history counter will only indicate the first cycle of the first error. The multi-cycle error history latch 314 solves this problem. If a single error persists, or if multiple errors in a group occur during different cycles, then the multi-cycle EAL is set, and the service processor code may assess the damage using all the trace RAM entries between the one pointed to by the error history counter, and the last entry made before clocks were turned off.

For instance, suppose that an error occurs in a B cycle move out control signal. The move out in the preferred system involves 128 byte lines of the cache which are supplied to the system controller through a 64 byte move out register. Then, 16 byte wide transfers are made from the move out register to the system controller. Thus, two pipeline passes must be made to complete the move out. If an error occurs in the B cycle of a first pass of the pipeline, an error history counter will start, an error history latch will be set, and the clock pinch will begin. If the error occurs again in the B cycle of a subsequent pass for the move out, the error cannot start the error history counter because it is already started, and it cannot set the error history latch. However, the multi-cycle EAL latch will be set, and the trace RAM will store necessary state information for analyzing the effect of the error.

FIG. 6 provides a flow chart for the service processor routine which is used to analyze the trace data. The routine begins when an error occurs (block 400). When the error occurs, a signal is generated to stop the clocks (block 401). Next, an error monitor in the scan interface detects the error (block 402). The scan interface then generates an interrupt request for the service processor (block 403). The service processor then interrupts its current routine and logs out the scannable locations in the integrated circuits (LSI) of the unit (block 404). Next, initial error assessment begins in the service processor using error history latches and the like to call appropriate assessment routines (block 405). In parallel with the initial error assessment, the RAM data locations are logged out through the scan interface (block 406). Next, the storage unit error routines review the trace RAM data (block 407) and perform other error analysis. After the storage unit error routines, the service processor performs global error routines (block 408) which assess the effect of the error on other units of the system. Next, the service processor issues commands to reconfigure hardware in the storage unit, if needed (block 409). In the next step, the error history latches are reset (block 410) and then the clocks are restarted (block 411). Then, the scan interface error monitoring logic, which is disabled at the interrupt step, is released for further error monitoring (block 412).

After these initial error logging steps are carried out, first fault analysis of the log, including the trace RAM data, is performed (block 413). After the first fault analysis, threshold tables used for reconfiguration decisions and other maintenance related issues are updated (block 414). The fault analysis is appended to the log (block 415) and the log is moved to disk (block 416). Finally, the service processor interrupt service routine is exited (block 417).

In summary, error assessment is written in software executed by the service processor. Any storage unit detected error sets a trace RAM bit during the cycle or cycles of the error. Once a particular service processor code module has been called, based on an error history latch that is set, the service code examines the trace table during the cycle in which the error was found. If the multiple cycle error action latch bit is set, then the service processor also examines the trace table entries from the first cycle indicated by the error history counter to the last cycle before the clocks went off, looking for additional assertions of the trace table error bit. The retriability and severity of the determination, as well as the repair and reconfiguration done, will be based upon the most severe and the least retriable cycles in which the trace table error bit is set.

Accordingly, a robust and flexible error analysis system has been provided. The system allows error analysis to be executed in software using a large amount of information available from the unit of the data processing system.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

What is claimed is:

1. An apparatus for tracing errors in a data processing system having a clock, error detection logic which stops the clock within a number of cycles after detection of an error and a plurality of signal lines, comprising:

a memory having an input port and an output port;

means, coupled to the memory and the plurality of signal lines, for connecting the plurality of signal lines in parallel to the input port of the memory;

means, coupled to the clock and the input port of the memory, for storing information from the plurality of signal lines on the input port in successive locations in the memory in response to successive cycles of the clock;

means, coupled to the output port of the memory and the error detection logic, for reading the information in the memory for use in error analysis after detection of an error; and means, coupled with the error detection logic, for storing a multiple error signal upon a second occurrence of an error between a first occurrence of said error and the stopping of the clock in response to the first occurrence of said error, for use in analysis of the information in the memory.

2. The apparatus of claim 1, further including:

means, coupled with the input port of the memory and the error detection logic, for identifying a storage location corresponding to a cycle in which an error was detected.

3. The apparatus of claim 2, wherein the means for identifying includes:

means, coupled with the error detection logic, for counting the number of cycles of the clock after detection of an error until stopping of the clock for using in analysis of the information in the memory.

4. The apparatus of claim 2, wherein the means for identifying includes:

means, coupled with the memory and the error detection logic, for tagging storage locations corresponding to cycles in which an error was detected.

5. The apparatus of claim 1, wherein the means for storing comprises addressing logic controlled with the clock which stores a current address for use in analysis of the information in the memory.

6. The apparatus of claim 1, wherein the means for storing comprises a circular buffer address generator controlled with the clock which stores a current address for use in analysis of the information in the memory.

7. The apparatus of claim 6, wherein the error detection logic generates an any-error signal upon detection of any error, and the plurality of signal lines include a signal line for the any-error signal, so that cycles in which errors are detected between the first error and stopping of the clock, are identified in the memory.

8. The apparatus of claim 1, further including:
means, coupled with the error detection logic, for counting the number of cycles of the clock after detection of an error until stopping of the clock; and
wherein the means for storing comprises addressing logic controlled with the clock which stores a current address for use in combination with the number of clock cycles after detection of an error until stopping of the clock to identify a location in the memory storing information corresponding to the cycle in which the error was detected.

9. For a data processing system having a clock, error detection logic which stops the clock within a number of cycles after detection of an error, and a processing unit responsive to the clock including a plurality of integrated circuits interconnected by primary circuit paths, an apparatus for tracing errors in the processing unit, comprising:
a memory having an input port, an output port and a plurality of multibit storage locations;
means, coupled to the memory and a subset of the primary circuit paths, for connecting the subset of the primary circuit paths in parallel to the input port of the memory;
means, coupled to the clock and the input port of the memory, for storing information from the subset in successive storage locations in the memory in response to successive cycles of the clock, including addressing logic controlled with the clock which stores a current address;
counting means, coupled with the error detection logic, for counting the number of cycles of the clock after detection of an error until stopping of the clock;
means, coupled to the output port of the memory, the error detection logic and the counting means, for reading the information in the memory, the number cycles from the counting means and the current address for use in error analysis after detection of an error; and
means, coupled with the error detection logic, for storing a multiple error signal upon a second occurrence of an error between a first occurrence of said error and the stopping of the clock in response to the first occurrence of said error, for use in analysis of the information in the memory.

10. The apparatus of claim 9, further including:
means, coupled with the input port of the memory and the error detection logic, for tagging storage locations corresponding to cycles in which an error was detected.

11. The apparatus of claim 9, wherein the error detection logic generates an any-error signal upon detection of any error, and the primary circuit paths include a path for the any-error signal, so that storage locations corresponding to cycles in which errors are detected are tagged in the memory.

12. For a data processing system having a plurality of processing units, a clock controller supplying clocks for the plurality of processing units, error detection logic within the processing units which signals the clock controller to stop the clock for the processing unit within a number of cycles after detection of an error, a scan interface to the processing units providing access to storage locations in the processing units independent of the clock for the processing unit, and a service processor independent of the clocks for the processing units for performing error analysis, an apparatus for tracing errors in a particular processing unit in the plurality of processing units, comprising:
a memory having an input port, an output port and a plurality of multibit storage locations;
means, coupled to the memory and a set of storage locations in the particular processing unit, for connecting the set in parallel to the input port of the memory;
means, responsive to the clock for the particular processing unit and coupled with the input port of the memory, for storing information from the set on the input port in successive storage locations in the memory in response to successive cycles of the clock for the particular processing unit, including addressing logic which stores a current address;
counting means, coupled with the error detection logic in the particular processing unit and with the service processor, for counting the number of cycles after detection of an error until stopping of the clock for the particular processing unit;
means, coupled to the output port of the memory and to the means for storing, for connecting the output port and the means for storing to the scan interefface for supplying the information in the memory and the current address to the service processor after stopping the clock for the particular processing unit; and
means, coupled with the error detection logic, for storing a multiple error signal upon a second occurrence of an error between a first occurrence of said error and the stopping of the clock in response to the first occurrence of said error, for use in analysis of the information in the memory.

13. The apparatus of claim 12, further including:
means, coupled with the input port of the memory and the error detection logic, for tagging storage locations corresponding to cycles in which an error was detected.

14. The apparatus of claim 12, wherein the error detection logic stores an any-error signal for the particular processing unit upon detection of any error, and the set of storage locations includes a location for the any-error signal.

15. The apparatus of claim 12, wherein the particular processing unit comprises a cache memory storage unit.

* * * * *

UNITED STATES PATENT AND TRADEMARK OFFICE
CERTIFICATE OF CORRECTION

PATENT NO. : 5,444,859
DATED : August 22, 1995
INVENTOR(S) : Jeffrey L. Baker et al.

It is certified that error appears in the above-indentified patent and that said Letters Patent is hereby corrected as shown below:

Column 10, line 33, "pluraity" should be --plurality--;

Column 12, line 40 & 41, "intereface" should be --interface--.

Signed and Sealed this

Fourth Day of June, 1996

Attest:

BRUCE LEHMAN

Attesting Officer        Commissioner of Patents and Trademarks